No. 719,899. PATENTED FEB. 3, 1903.
C. STACEY.
COMBINED CAPE, BLANKET, AND SHELTER TENT.
APPLICATION FILED SEPT. 12, 1902.
NO MODEL.

Witnesses
Inventor
Cromwell Stacey
By Wilkinson & Fisher
Attorneys

UNITED STATES PATENT OFFICE.

CROMWELL STACEY, OF THE UNITED STATES ARMY.

COMBINED CAPE, BLANKET, AND SHELTER-TENT.

SPECIFICATION forming part of Letters Patent No. 719,899, dated February 3, 1903.

Application filed September 12, 1902. Serial No. 123,151. (No model.)

*To all whom it may concern:*

Be it known that I, CROMWELL STACEY, lieutenant in the United States Army, stationed at Angel Island, in the county of Marin and State of California, have invented certain new and useful Improvements in a Combined Cape, Blanket, and Shelter-Tent; and I do hereby declare the following to be a full, clear, and exact description of the invention, such as will enable others skilled in the art to which it appertains to make and use the same.

My invention relates to a combined cape, blanket, and shelter-tent.

It consists in providing a single-piece garment which is capable of use without the addition of any other textile fabric as a waterproof cape, a waterproof blanket, and a waterproof shelter-tent.

My invention will be understood by reference to the accompanying drawings, in which the same parts are indicated by the same characters throughout the several views.

Figure 1:
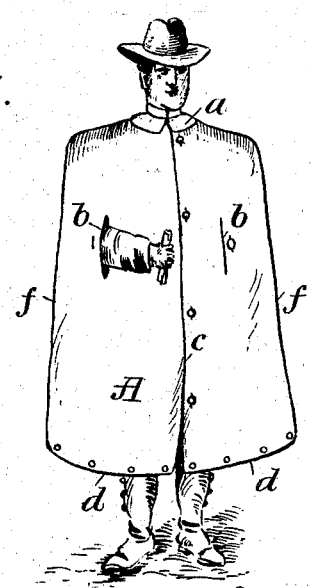
Figure 2:
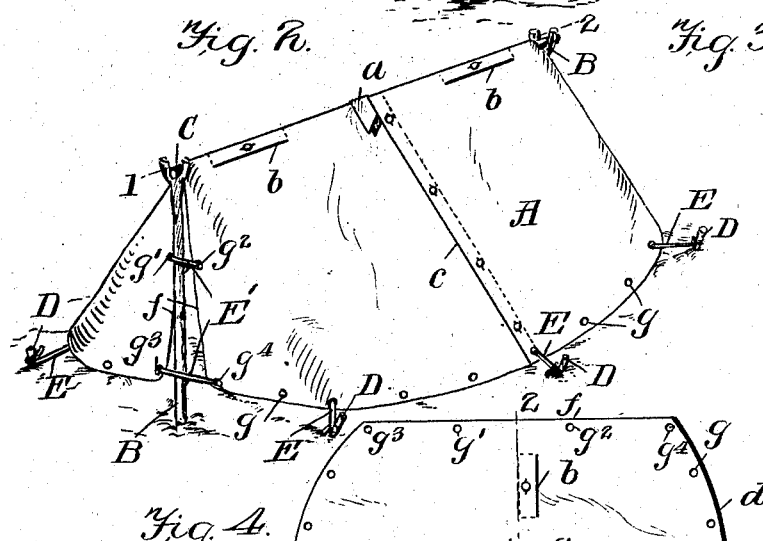
Figure 3:
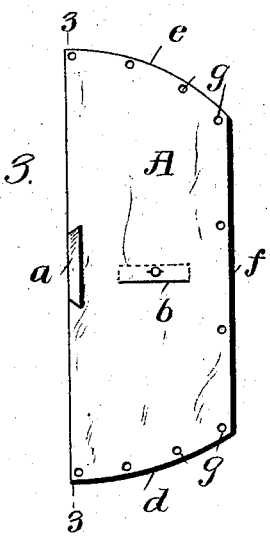
Figure 4:
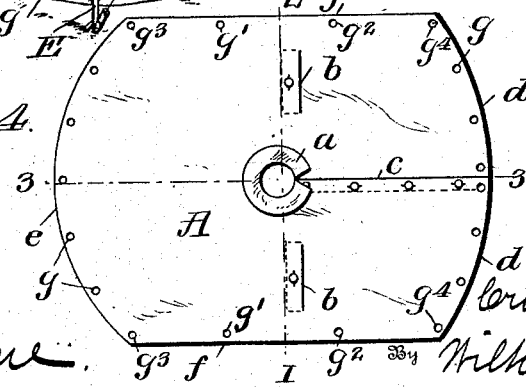

Figure 1 represents the device in use as a cape. Fig. 2 represents the device in use as a shelter-tent. Fig. 3 represents the device laid flat and suitable for use as a double blanket, and Fig. 4 is a plan view of the device when buttoned up and laid flat in the open position.

A represents a single piece of rubber or other waterproof material having a collar $a$, slits $b$, with flaps beneath the same and buttons to close said slits. These slits are intended to permit the passage therethrough of the hand and arm of the wearer when the device is used as a cape. The front edge of the device is slit, as at $c$, from the collar to the lower edge $d$ and is buttoned over a flap, as indicated in Fig. 4. The edges $d$ and $e$ are arranged as indicated, the distance from the collar to the edge $d$ being preferably somewhat less than that from the collar to the edge $e$, and the edges $f$ are preferably straight, as shown in Fig. 4. The distance across the cape from one edge $f$ to the opposite edge $f$ should preferably be about six feet. Around these several edges eyelets $g$ are placed. To use as a cape, the front $c$, being unbuttoned, the ends are thrown forward over the shoulders and are buttoned, as indicated in Fig. 1. If desired, the sides $f$ may be left open or a lacing may be run between the eyelets $g'$, $g^2$, $g^3$, and $g^4$. (See Fig. 4.)

For use as a shelter-tent two forked sticks and a ridge-pole C are provided. These would ordinarily be secured from the undergrowth or shrubbery at or near the camp and need not be carried along for the purpose. The device is thrown across the ridge-pole with the line 1 2 uppermost and with the front opening and the armholes buttoned up and with the collar bent over, as shown in Fig. 2. Then the sides of the tent are drawn out by lacing E, secured to the tent-pegs D. One or both ends of the tent may be left open, or either or both may be closed by lacings E'.

To use the device as a rubber blanket, it is simply folded along the line 3 3 of Fig. 1 to make the shape indicated in Fig. 3. The foot end may then be laced up or not, as may be desired.

Thus it will be seen that I have provided a single-piece garment which can be used either as a cape, a shelter-tent, or a double rubber blanket without the addition of any other textile fabric or without the addition of any other parts than a little cord or lacing, or in the case of a tent of such material as may be readily cut from near-by trees or saplings.

Having thus described my invention, what I claim, and desire to secure by Letters Patent of the United States, is—

A garment capable of use as a cape, a blanket, or a shelter-tent, consisting of a single piece of waterproof fabric having rounded ends and parallel sides with eyelets along the border thereof and provided with a collar-opening, and a collar arranged to turn up and close the said opening when desired, a slit for the front and slits for the armholes, and flaps for buttoning over said slits, substantially as described.

In testimony whereof I affix my signature in presence of two witnesses.

CROMWELL STACEY.

Witnesses:
  JOHN W. FRENCH,
  P. A. CONNOLLY.